US011858151B2

(12) United States Patent
Bellisario

(10) Patent No.: US 11,858,151 B2
(45) Date of Patent: Jan. 2, 2024

(54) SCISSORS WITH INTEGRATED COMB HAVING BLADE-BASED MEASUREMENT PORTIONS

(71) Applicant: Lori Bellisario, North Huntingdon, PA (US)

(72) Inventor: Lori Bellisario, North Huntingdon, PA (US)

( * ) Notice: Subject to any disclaimer, the term of this patent is extended or adjusted under 35 U.S.C. 154(b) by 55 days.

(21) Appl. No.: 17/686,141

(22) Filed: Mar. 3, 2022

(65) Prior Publication Data

US 2023/0278242 A1 Sep. 7, 2023

(51) Int. Cl.
*B26B 13/24* (2006.01)
*A45D 24/18* (2006.01)

(52) U.S. Cl.
CPC .............. *B26B 13/24* (2013.01); *A45D 24/18* (2013.01)

(58) Field of Classification Search
CPC ................................ B26B 13/24; A45D 24/18
USPC ............................................................ 30/226
See application file for complete search history.

(56) References Cited

U.S. PATENT DOCUMENTS 464,075 A * 12/1891 Krank ..................... B26B 11/00 30/120
536,086 A * 3/1895 Krank ....................... B25B 7/22 30/271
667,914 A * 2/1901 Klever ...................... B25B 7/22 30/271
884,821 A * 4/1908 Huhta ..................... B26B 13/24 7/164
2,181,448 A * 11/1939 Behr ...................... A45D 24/18 132/122
2,629,171 A * 2/1953 Boegehold .............. B26B 13/22 30/250
5,259,114 A * 11/1993 Shorter ................... B26B 13/24 132/148
5,970,615 A * 10/1999 Wall ........................ B26B 13/24 30/142
8,746,257 B1 * 6/2014 Holmes .................. A45D 24/00 132/148
9,744,679 B2 * 8/2017 Wang ...................... B26B 13/22
2007/0130780 A1 * 6/2007 Hobbs ..................... B26B 13/24 30/195
2008/0201962 A1 * 8/2008 Sugawara .............. A45D 24/36 132/213.1
2009/0044411 A1 * 2/2009 Cotant ................... A45D 24/36 132/213.1
2009/0106984 A1 * 4/2009 Braswell ................ B26B 13/22 30/233

(Continued)

*Primary Examiner* — Omar Flores Sanchez
(74) *Attorney, Agent, or Firm* — Ference & Associates LLC

(57) ABSTRACT

One embodiment provides a pair of scissors, including: a first scissor member being pivotally connected to a second scissor member with a joint member at connecting portions; each of the first scissor member and the second scissor member comprising: an upper surface, a lower surface, an inner side, an outer side, a cutting edge on the inner side, a measurement portion positioned on the upper surface abutting the cutting edge and spanning a length thereof, and gripping means; wherein the first scissor member comprises a first integrated comb portion having a first plurality of teeth; wherein the second scissor member comprises a second integrated comb portion having a second plurality of teeth. Other aspects are described and claimed.

15 Claims, 3 Drawing Sheets

(56) References Cited

U.S. PATENT DOCUMENTS

| | | | | |
|---|---|---|---|---|
| 2009/0139093 | A1* | 6/2009 | Moreschini | B26B 19/28 132/148 |
| 2014/0033542 | A1* | 2/2014 | Covel | B26B 1/04 30/255 |
| 2014/0053860 | A1* | 2/2014 | Temple | A45D 24/14 132/200 |
| 2014/0251358 | A1* | 9/2014 | Temple | A46B 5/021 132/212 |
| 2014/0360025 | A1* | 12/2014 | Hyma | B26B 13/20 30/254 |

* cited by examiner

SCISSORS WITH INTEGRATED COMB HAVING BLADE-BASED MEASUREMENT PORTIONS

BACKGROUND

Conventional scissors have a plurality of different well-known uses. For instance, scissors may be used to cut hair, string, cloth, other objects, and the like. With respect to hair cutting, scissors have been used by barbers and hair stylists, along with a plurality of other tools and implements (e.g., clippers, etc.), to cut hair to a certain length and/or style.

BRIEF SUMMARY

In summary, one aspect provides scissors, comprising: a first scissor member being pivotally connected to a second scissor member with a joint member at connecting portions; each of the first scissor member and the second scissor member comprising: an upper surface, a lower surface, an inner side, an outer side, a cutting edge on the inner side, a measurement portion positioned on the upper surface abutting the cutting edge and spanning a length thereof, and gripping means; wherein the first scissor member comprises a first integrated comb portion having a first plurality of teeth; wherein the second scissor member comprises a second integrated comb portion having a second plurality of teeth.

Another aspect provides scissors, comprising: a first scissor member being pivotally connected to a second scissor member with a joint member at connecting portions; each of the first scissor member and the second scissor member comprising: an upper surface, a lower surface, an inner side, an outer side, a cutting edge on the inner side, a measurement receiving portion positioned on the upper surface abutting the cutting edge and spanning a length thereof, and gripping means; wherein the first scissor member comprises a first integrated comb portion having a first plurality of teeth; wherein the second scissor member comprises a second integrated comb portion having a second plurality of teeth.

A further aspect provides a method, including: engraving, via an engraving means, a measurement portion on an upper surface of each of a first scissor member and a second scissor member; wherein the first scissor member is pivotally connected to the second scissor member with a joint member at connection portions; wherein each of the first scissor member and the second scissor member further comprises: a lower surface, an inner side, an outer side, a cutting edge on the inner side, and gripping means; wherein the measurement portion abuts the cutting edge and spans a length thereof; wherein the first scissor member comprises a first integrated comb portion having a first plurality of teeth; wherein the second scissor member comprises a second integrated comb portion having a second plurality of teeth.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
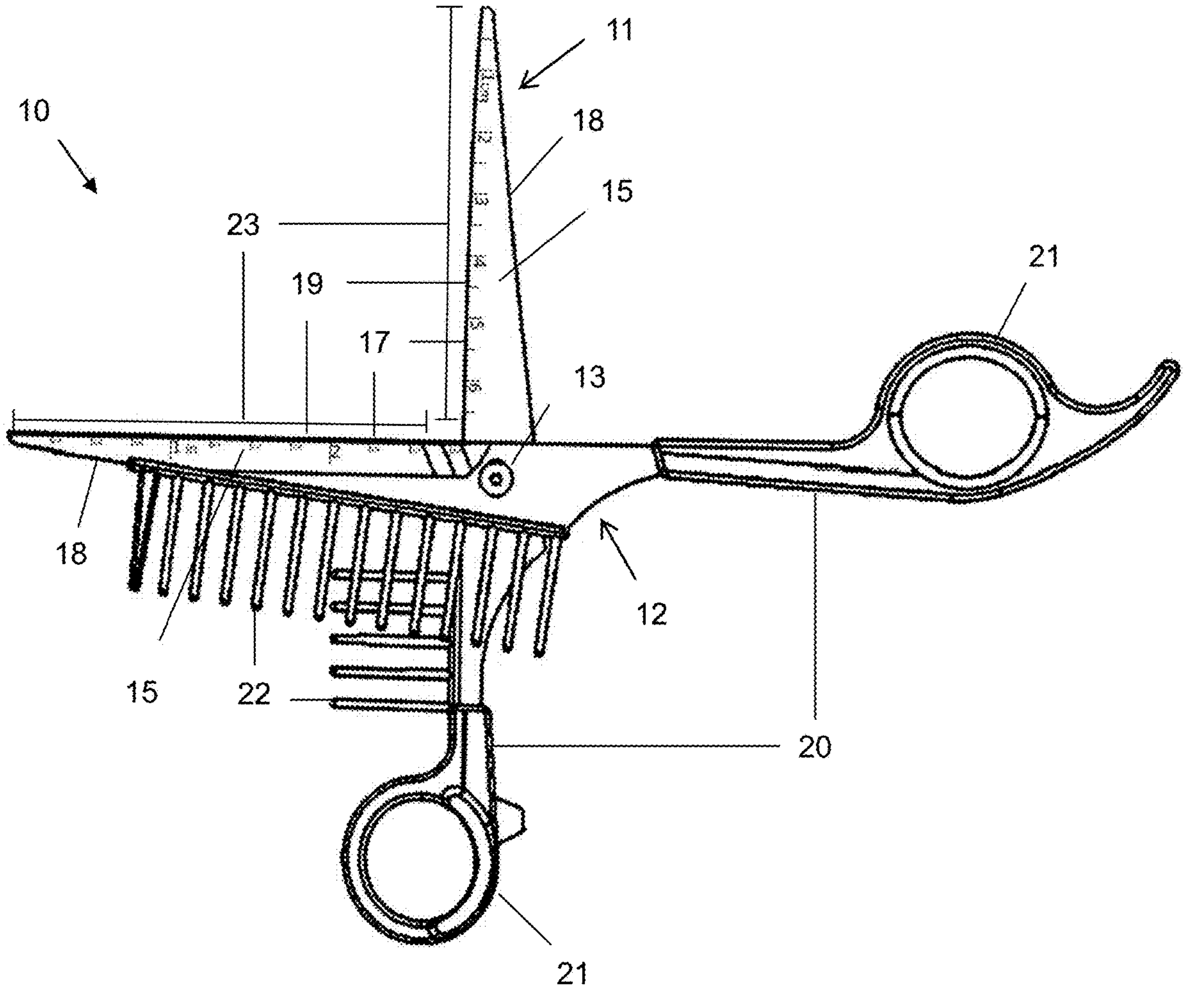
FIG. 1 illustrates a front view of scissors according to an embodiment showing a state in which the scissors are open.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Scissors have been a foundational tool in hair cutting for generations. More particularly, hair cutters (e.g., barbers, stylists, etc.) utilize scissors to cut off specified amounts of a customer's hair in order to achieve a desired length. Conventionally, the length of hair to be cut is generally estimated by the barber or stylist. For example, responsive to receiving a customer instruction (e.g., "I would like to cut off one inch of hair"), the hair cutter may estimate what one inch of hair corresponds to (e.g., by utilizing their fingers to partition out one inch of the customer's hair). Experienced hair cutters may have a good feel for what a particular measurement corresponds to with respect to hair length. However, it may be difficult to maintain a consistent estimate throughout the duration of the entire haircut.

In some situations, a hair cutter may use a secondary tool (e.g., a ruler, etc.) to ensure that they are cutting off the specified amount of hair. However, utilization of the second tool may be burdensome to the hair cutter and may slow down the hair cutting process. Additionally, any additional object utilized to cut hair is another object that must be cleaned and sterilized in-between haircuts, which may be time-consuming and may have an adverse effect on customer volume.

Accordingly, an embodiment provides a pair of scissors having measurements portions thereon. In an embodiment, the measurements portions may be located on an upper surface of the blade on each scissor member and extend along a length of each scissor blade. The measurement portions may contain ruler-like measurements in various metrics (e.g., inches, centimeters, etc.) that may aid a hair cutter in cutting precise lengths of hair. As discussed further herein, the type of measurement portion and implementation herein may vary. Additionally, in certain embodiments, the scissors may contain one or more integrated combed portions that may allow a hair cutter to more easily isolate portions of a customers' hair.

The illustrated example embodiments will be best understood by reference to the figures. The following description is intended only by way of example, and simply illustrates certain example embodiments.

Referring now to FIG. 1, a pair of scissors 10 having measurement portions is illustrated. The scissors 10 may be comprised of a first scissor member 11 that is pivotally connected to a second scissor member 12 with a joint member 13 (e.g., a pin, a screw, etc.). The joint member 13 may connect the first scissor member 11 to the second scissor member 12 at specified connection portions 14 (illustrated in FIG. 2) on each member.

In an embodiment, each scissor member 11, 12 may contain an upper surface 15, a lower surface 16 (not pictured) opposite the upper surface 15, an inner side 17, an outer side 18, a cutting edge 19 located along a length of the inner side 17, and a gripping base 20 having gripping means to hold/secure the scissors 10. In an embodiment, the gripping base 20 may be composed of a variety of different types of material (e.g., rubber, etc.). In an embodiment, the gripping base 20 may terminate in a finger loop 21 that may support a user's finger (as illustrated in FIG. 1). In some embodiments, the finger loop 21 may contain padding (not illustrated) located on the inside of the finger loop 21 to make gripping of the scissors more comfortable.

Additionally, in certain embodiments, one or both scissor members 11, 12 may contain an integrated comb portion 22. The integrated comb portion 22 may contain a plurality of teeth that may enable a hair cutter to more easily isolate and hold a certain amount of hair. In situations where each scissor member 11, 12 contains an integrated comb portion 22, the integrated comb portions 22 may be of the same or different length. In some configurations, when the scissors are in a closed configuration the integrated comb portions 22 on each scissor member 11, 12 may substantially align to resemble a singular comb. For example, the scissors 10 illustrated in FIG. 1 provide an integrated comb portion 22 on each scissor member 11, 12 and wherein the integrated comb portion 22 is a different length on each scissor member 11, 12 (i.e., the integrated comb portion 22 is shorter on scissor member 11 than on scissor member 12).

In an embodiment, one or both scissor members 11, 12 may contain a measurement portion 23. In an embodiment, the measurement portion 23 may abut the cutting edge 19 and span a length of the inner portion 17 thereof. More particularly, the measurement portion 23 may span the entire length of the cutting edge 19 and terminate at the gripping base 20. In an embodiment, the measurement portion 23 may contain a plurality of measurements in a predetermined measurement metric (e.g., inches, centimeters, etc.).

Figure 2:
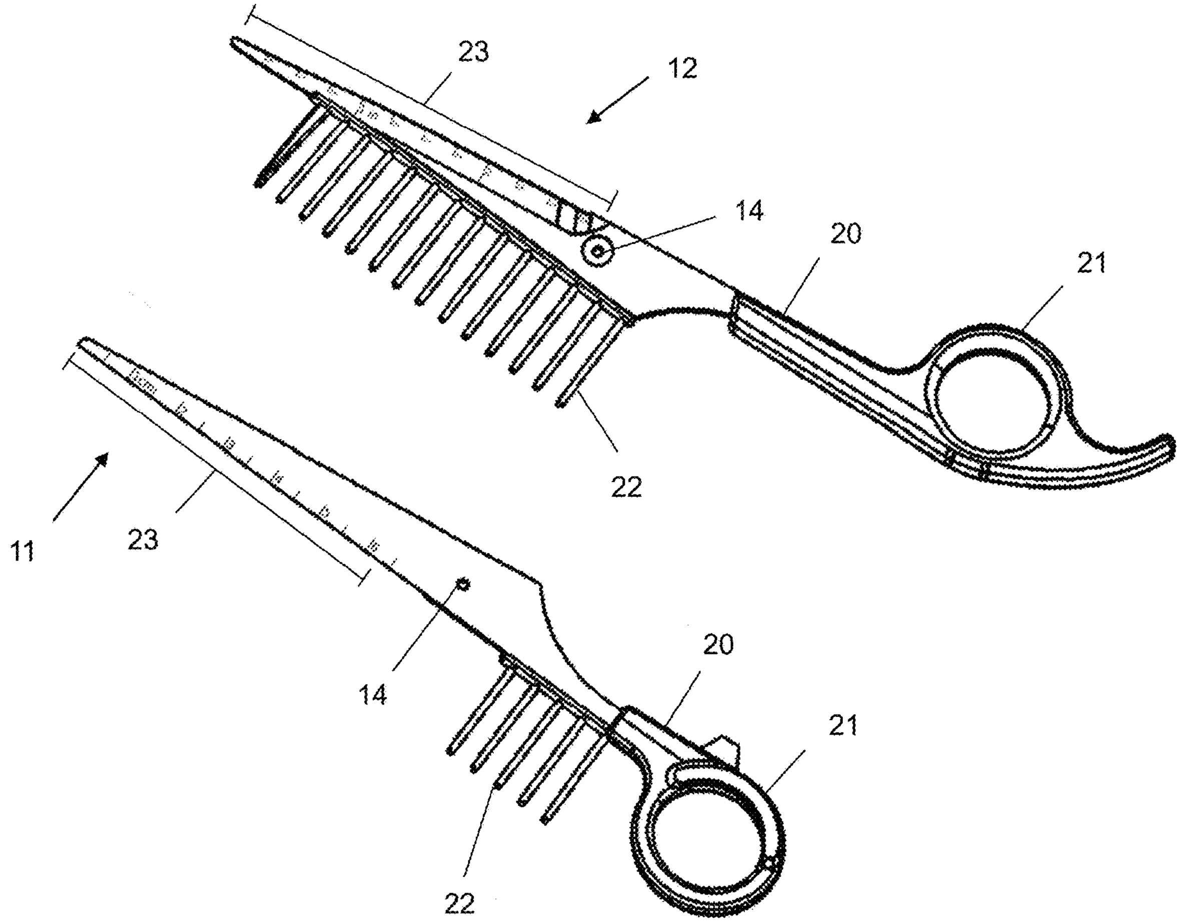
FIG. 2 illustrates a segmented, front view of scissors according to an embodiment showing individual scissor members.

Referring now to FIG. 2, a segmented view of individual scissor members 11 and 12 is provided. As can be seen from figure, each of the scissor members 11, 12 may contain each of the elements and portions as described above. Furthermore, scissor member 11 may be pivotally connected to scissor member 12 at a connection portion 14 by a joint member 13.

In an embodiment, the measurement portion 23 may be integrated into one or both of the scissor members 11, 12. Integration of the measurement portion 23 into the scissor members 11, 12 may be accomplished via a conventional engraving means (e.g., etch engraving, laser engraving, etc.). In an embodiment, the engraving process may be facilitated at an established engraving factory, center, or production facility. In an embodiment, each of the scissor members 11, 12 may be configured to have the same predetermined measurement metric (e.g., both scissor members have measurements in inches, both scissor member have measurement in centimeters, etc.). Alternatively, each of the scissor members 11, 12 may be configured to have different predetermined measurement metrics, as illustrated in FIG. 1 (e.g., the measurement portion on one scissor member is configured to be in inches whereas the other measurement portion on the other scissor member is configured to be in centimeters).

In situations where the measurement portion 23 is not integrated into the scissor members 11, 12, the measurement portion 23 may be attachable to the scissor members 11, 12 at a measurement receiving portion (not pictured). In an embodiment, the measurement receiving portion may be an area that substantially corresponds to an area occupied by an integrated measurement portion. The attachable measurement portions may manifest in one or more different ways and may be attachable to the scissor members 11, 12 at the measurement receiving portion via one or more different attachment means, as further described below.

In one embodiment, the attachable measurement portion may be a sticker that may be attachable directly to the upper surface 15 of either of the scissor members 11, 12. In an embodiment, the measurements may be printed directly on the sticker and may contain virtually any type of measurement and may be printed in virtually any color. A user may buy these stickers individually (i.e., as a dedicated sticker pack) or may find these stickers in a pack along with the novel scissors as described herein. In an embodiment, the upper surface of the relevant scissor members 11, 12 may contain one or more engraved delineations (e.g., engraved vertical lines, an outlined area, etc.). These delineations essentially outline the measurement receiving portion to a user on the scissor members 11, 12. More particularly, the delineations may help guide a user in placing the sticker onto the upper surface of either of the scissor members 11, 12 by providing them with a more concrete idea of where to place the sticker.

Figure 3A:
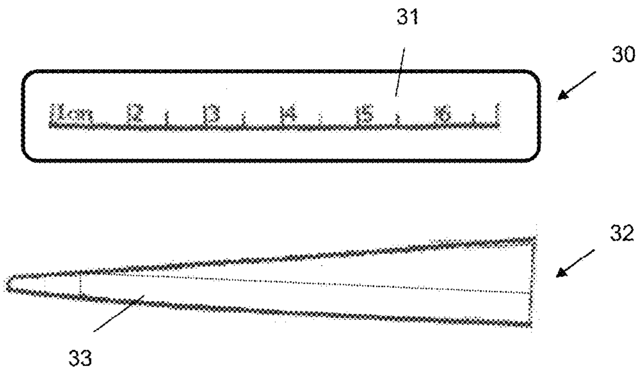
FIG. 3A illustrates a removable sticker according to an embodiment.
Figure 3B:
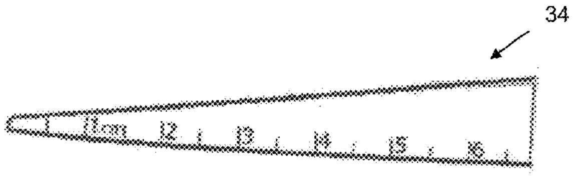
FIG. 3B illustrates a removable sticker according to another embodiment.

Further to the foregoing and with reference to FIG. 3(A-B), a non-limiting example of an attachable measurement portion in the form of a sticker is provided. More particularly, FIG. 3A illustrates a sticker base 30 on which a removable sticker 31 is attached. In this situation, the removable sticker 31 contains printed measurements manifest as centimeters. A single blade 32 of a pair of scissors is also shown. The single blade 32 in this situation contains an outlined delineation area 33, which may provide an indication to an user of the proper place to put the removable sticker 31. Accordingly, once the user removes the removable sticker 31 from the sticker base 30, they can place it on the delineation area 33 of the single blade 32 in order to form the product illustrated at FIG. 3B.

In another embodiment, the attachable measurement portion may be a thin patch (not pictured) having an upper and lower surface. The upper surface of the patch may contain the measurements (e.g., printed thereon) and the lower surface of the patch may contain a set of small hooks or fasteners (not pictured) that may interact with a corresponding set of hooks or fasteners on the measurement receiving portion to secure the attachable measurement portion to the measurement receiving portion. Such an implementation may exist on both scissor members 11, 12 or may exist on only scissor member (e.g., the "top" scissor member 12 for which the upper surface of the cutting blade is not interfered with by the "bottom" scissor member 11 when the scissors 10 are in the closed configuration, etc.).

In another embodiment, the measurement receiving portion may comprise a writing surface (not pictured). In an embodiment, the writing surface may be a blackboard material, a whiteboard material, or virtually any other type of applicable writing surface. In an embodiment, users of the scissors may utilize a writing implement (e.g., a marker, chalk, etc.) to make markings (e.g., measurements, etc.) on the measurement receiving portion.

The various embodiments described herein thus represent a technical improvement to conventional scissor implementations. Specifically, the measurement portions integrated on the scissors or attachable to the scissors may enable a user to quickly take measurements of hair length without the need for an additional tool (e.g., a separate ruler, etc.). Such a technical improvement may increase hair cutting speed and may also ensure a consistent cut length throughout the entire hair cutting process.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. Scissors, comprising:

a first scissor member being pivotally connected to a second scissor member with a joint member at connecting portions;

each of the first scissor member and the second scissor member comprising: an upper surface, a lower surface, an inner side, an outer side, a cutting edge on the inner side, a measurement portion positioned on the upper surface abutting the cutting edge and spanning a length thereof, and gripping means;

wherein the first scissor member comprises a first integrated comb portion having a first plurality of teeth;

wherein the second scissor member comprises a second integrated comb portion having a second plurality of teeth; and wherein the first integrated comb portion is shorter in length than the second integrated comb portion so that the first integrated comb portion substantially aligns with the second integrated comb portion when the scissors are in a closed position.

2. The scissors of claim 1, wherein the measurement portion comprises a measurement metric selected corresponding to one of: a centimeter and an inch.

3. The scissors of claim 1, wherein the measurement portion is integrated into each of the first scissor member and the second scissor member on the upper surface.

4. The scissors of claim 3, wherein the measurement portion is integrated via an engraving means.

5. The scissors of claim 1, wherein the measurement portion on the first scissor member comprises a first predetermined measurement metric and wherein the measurement portion on the second scissor member comprises a second predetermined measurement metric.

6. The scissors of claim 5, wherein the first predetermined measurement metric is different than the second predetermined measurement metric.

7. The scissors of claim 1, wherein the gripping means comprise a finger loop.

8. Scissors, comprising:

a first scissor member being pivotally connected to a second scissor member with a joint member at connecting portions;

each of the first scissor member and the second scissor member comprising: an upper surface, a lower surface, an inner side, an outer side, a cutting edge on the inner side, a measurement receiving portion positioned on the upper surface abutting the cutting edge and spanning a length thereof, and gripping means;

wherein the first scissor member comprises a first integrated comb portion having a first plurality of teeth;

wherein the second scissor member comprises a second integrated comb portion having a second plurality of teeth; and wherein the first integrated comb portion is shorter in length than the second integrated comb portion so that the first integrated comb portion substantially aligns with the second integrated comb portion when the scissors are in a closed position.

9. The scissors of claim 8, wherein the measurement receiving portion comprises at least one delineation engraved on the upper surface.

10. The scissors of claim 9, wherein a sticker-based measurement portion is attachable directly to the measurement receiving portion and is aligned via the at least one delineation.

11. The scissors of claim 10, wherein the sticker-based measurement portion comprises a predetermined measurement metric printed thereon.

12. The scissors of claim 8, wherein the measurement receiving portion comprises a writing surface.

13. The scissors of claim 12, wherein the writing surface is selected from the group consisting of a blackboard material or a whiteboard material.

14. The scissors of claim 12, wherein the writing surface is configured to receive writing input from a writing means.

15. A method, comprising:

engraving, via an engraving means, a measurement portion on an upper surface of each of a first scissor member and a second scissor member;

wherein the first scissor member is pivotally connected to the second scissor member with a joint member at connection portions;

wherein each of the first scissor member and the second scissor member further comprises: a lower surface, an inner side, an outer side, a cutting edge on the inner side, and gripping means;

wherein the measurement portion abuts the cutting edge and spans a length thereof wherein the first scissor member comprises a first integrated comb portion having a first plurality of teeth;

wherein the second scissor member comprises a second integrated comb portion having a second plurality of teeth; and wherein the first integrated comb portion is shorter in length than the second integrated comb portion so that the first integrated comb portion substantially aligns with the second integrated comb portion when the scissors are in a closed position.

* * * * *